United States Patent [19]

Woeckener et al.

[11] 4,214,857
[45] Jul. 29, 1980

[54] MULTI-ROLL CALENDER

[75] Inventors: Willi Woeckener; Werner Pawelczyk; Klaus-Dieter Marquardt, all of Hanover, Fed. Rep. of Germany

[73] Assignee: Hermann Berstorff Maschinenbau GmbH, Hannover-Kleefeld, Fed. Rep. of Germany

[21] Appl. No.: 841,706

[22] Filed: Oct. 13, 1977

Related U.S. Application Data

[62] Division of Ser. No. 727,529, Sep. 28, 1976, Pat. No. 4,110,387.

[30] Foreign Application Priority Data

Oct. 1, 1975 [DE] Fed. Rep. of Germany ....... 2543738

[51] Int. Cl.² ............................................. B29D 7/14
[52] U.S. Cl. .................................. 425/141; 425/145; 425/149; 425/335; 425/366; 425/367
[58] Field of Search ..................... 264/40.1, 40.5, 175; 425/141, 145, 149, 335, 366, 367

[56] References Cited

FOREIGN PATENT DOCUMENTS 481452 10/1975 U.S.S.R. .................................. 425/149

Primary Examiner—Jan J. Silbaugh
Attorney, Agent, or Firm—Schwartz, Jeffery, Schwaab, Mack, Blumenthal & Koch

[57] ABSTRACT

The multi-roll calender for producing a sheet of elastomeric material comprises a calender frame and a series of rolls mounted in the calender frame. The rolls including an intake roll and a series of vertically superimposed rolls, with all adjacent rolls being variably spaced so as to provide variable roll gaps between each adjacent pair of rolls. Means are associated with the rolls for sensing the pressure of the material being calendered in each roll gap and means are provided on opposite ends of certain of the rolls responsive to the sensing means for adjusting the width of each roll gap formed by adjacent rolls to cause the difference between the pressures in said gaps to be as small as is practicable. Means are provided for maintaining the adjusted pressures substantially constant.

10 Claims, 1 Drawing Figure

U.S. Patent   Jul. 29, 1980   4,214,857
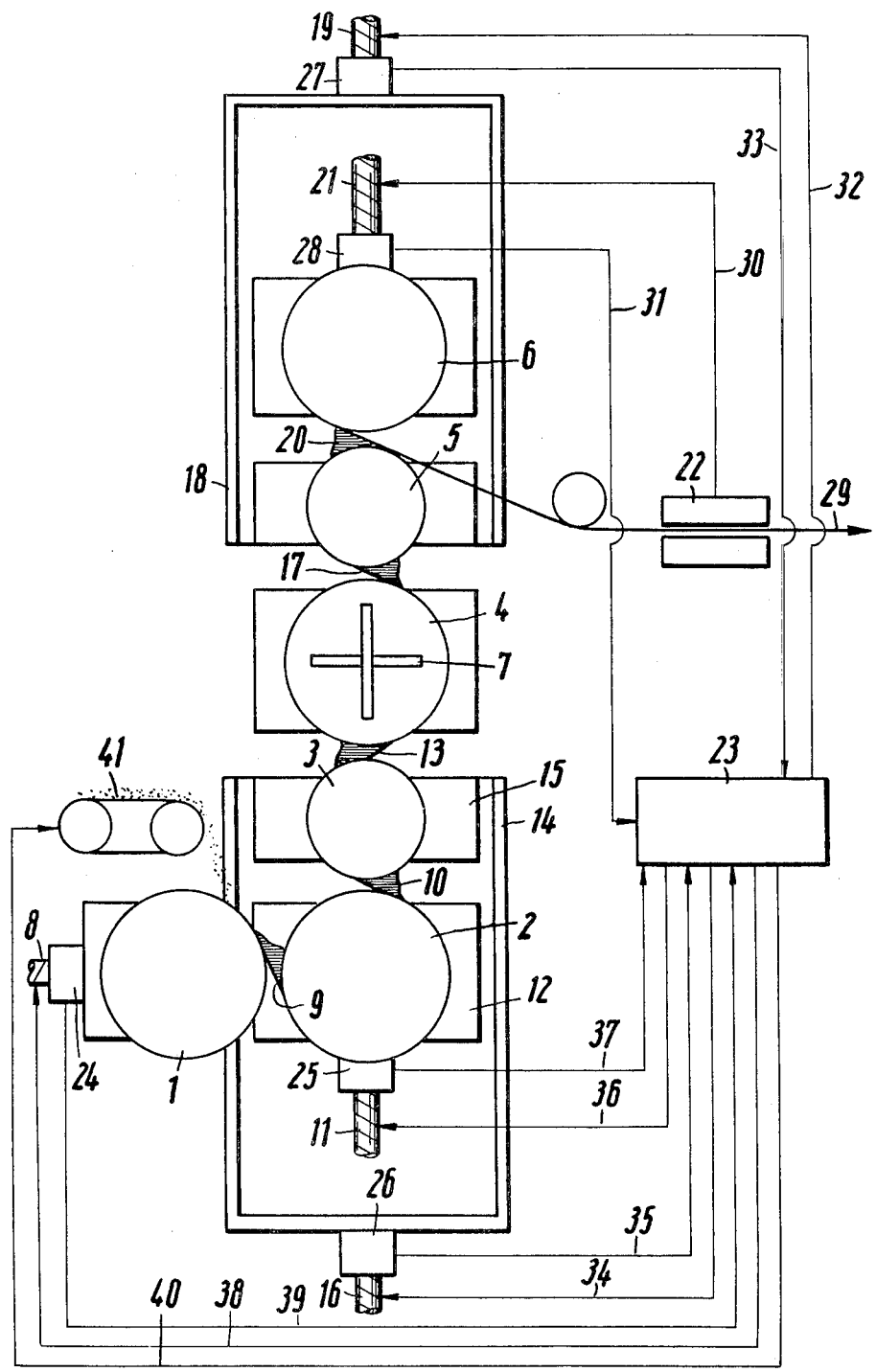

MULTI-ROLL CALENDER

This is a division of application Ser. No. 727,529, filed Sept. 28, 1976, now U.S. Pat. No. 4,110,387.

The invention relates to a multi-roll calender and a method of controlling operation thereof for producing sheets of synthetic plastic rubber or other elastomeric material.

In such a calender material being calendered in the roll gaps which follow one after another in the direction of movement of the sheet exerts on the calender a pressure which, when a critical value is exceeded causes flexion of the rolls.

Such a calender may have at least three entirely or partially heated and driven rolls mounted parallel with and adjacent to and/or above one another. The distances between the neighbouring roll shells are precisely adjustable and form the roll gap. During calendering, the plastically deformable material passes through one after another of the gaps between the individual rolls which succeed one another in the direction of movement of the web, each time for practical purposes assuming the thickness which corresponds to the gap between the rolls through which it has just passed.

The material being worked resists the shaping and this resistance has to be overcome by the calender. The necessary shaping effort is applied by the drive motors of the calendering rolls and is transmitted to the plastics composition via the rolls. Thus, a pressure builds up in the roll gap which is required on the one hand to shape the plastics composition and on the other seeks to press apart or produce flexion in the calendering rolls.

The greater the viscosity of the material worked, the larger the diameter of the rolls, the higher the relative peripheral speed of the rolls and the smaller the gap between the rolls, so the greater the pressure will be. The pressure must not be allowed to rise arbitrarily, since the thickness of the web of film must be kept as small and as even as possible over the entire width. Furthermore, there are limits to the strength and flexural resistance of the calendering rolls.

It will be evident from the foregoing paragraph that the possibilities which initially present themselves of avoiding supercritical flexion in the calendering rolls are the reduction of the resistance to shaping offered by the composition worked, by more intensive heating, increase in the roll diameter, diminution of the relative speed of the rolls, enlargement of the roll gap, reduction of the length of the roll surface and exhaustion of the known possibilities of design, such as flexion counteracting means, roll crowning and oblique positioning of the rolls. Of these, only the structural possibilities can be unrestrictedly used, close limits being imposed on the other measures.

It is not possible for many cheap materials to be arbitrarily heated without manifesting clearly evident signs of chemical degradation and, even in a heat stabilised condition, many, when above certain temperatures, exhibit decomposition phenomena within the period necessary for working, such as discolouration and/or cleavage of chemical compounds, e.g. hydrogen chloride.

Enlarging the roll diameter to reduce the flexion in the rolls is likewise unfavourable, because the quality of sheet to be produced, determined by the regularity, smoothness and freedom from defects and air bubbles, is dependent particularly upon the frictional heat produced and thus upon the diameter of the rolls.

Similarly, a minimum relative speed between two rolls which form a gap must be maintained in order to produce a good quality sheet.

The gap size, i.e. the distance between the shells of two rolls, will naturally to a great extent determine the flexion in the calendering rolls, but increasing the roll gap cannot be a means of reducing roll flexion, since the width of the gap is determined by the thickness of the sheet to be produced.

One of the other possible ways of reducing calendering roll flexion mentioned, namely that of reducing the length of the effective roll surface, leads to what is, in the current aim for increasing rationalisation, an undesired reduction in the usable sheet width. The production of narrow sheets is very uneconomical, since they still require virtually the same capital outlay and the same unit of time.

Thus as far as possible it is desirable to combine small roll diameters in order to achieve good sheet quality and minimum roll flexion with long roll surfaces in order to maintain a regular thickness profile, and for this purpose, calenders with rolls of different diameter and dispositions have been developed. These are based on the intention of reducing the gap load and moreover bringing about better workability of the plastics composition by partially reducing the roll diameter. It is intended thereby that the smaller diameter rolls ensure good workability of the plastics material and thus good quality in the sheet produced, which is why they are also described as "working rolls". The task of the larger diameter rolls is to ensure negligible flexion in the smaller diameter rolls, such larger diameter rolls sometimes being referred to as "supporting rolls".

However, it has been found that for working many materials, such as for example polyvinyl chloride with a high K value, even these calenders are unsuitable, because the working rolls exhibit such intense flexion that they are no longer completely parallel with the larger diameter supporting rolls. The consequence is that a sheet is produced which is no longer even over its length and width, which is why in practice even calenders of over 1800 mm surface length and of over 550 mm diameter have not hitherto been envisaged for the working of such a material.

The invention has among its objects to provide a calender and a method of controlling such a calender with which any desired plastics materials including those of high viscosity and having a high resistance to working can be worked into if necessary very thin and qualitatively good sheets of even thickness over length and breadth and possibly of considerable width. To achieve this the invention solves the problem of avoiding flexion even in longer rolls or at least reducing such flexion to an admissible degree without resorting to large diameters which might negatively influence quality, and without risk of damage to the rolls or their bearings.

According to the invention there is provided a method of controlling a multi-roll calender producing a sheet of synthetic plastics, rubber or ether elastomeric material comprising sensing the pressure of material being calendered in roll gaps of the calender, which roll gaps follow one after another in the direction of movement of the sheet; adjusting the width of the two gaps formed with mating rolls on opposite sides of at least some of the rolls to cause the difference between the pressures in the two gaps to be as small as is practicable; and maintaining such pressures substantially constant.

In the case of calender rolls which are located one after another or one above another in a line, the forces occurring in the gap—with the exception of the first and last roll—act at always oppositely disposed locations, in other words staggered in each case by 180°. Thus, in their direction of application, they are directed just oppositely at the roll spindle, so that effectively only the difference of the two absolute amounts acts on the roll spindle. Thus, the flexion in the roll is dependent only upon the load differential. If the two gap loadings applied are of equal value, then the differential becomes "nil" and the calender roll cannot flex to one side. Without being limited thereto, this principle can be applied very well to a so-called supporting roll calender, in which working rolls of smaller diameter are each disposed between two larger diameter supporting rolls. In the case of manufacture of a sheet 0.10 mm thick and 2500 mm wide, from a very viscous material on a 6-roll calender with rolls of 700 mm and 450 mm diameter and 2600 mm roll surface length, for example, under quite extreme conditions, gap loads of in each case about 200 tons total loading occur in the last two gaps of the fifth roll. The sheet quality and regularity of thickness can be almost perfect if the difference between the two gap loads is no more than 25 tons. Preferably, this differential should not be above 10 to 15 tons, and outstanding results are achieved if it can be maintained at a value of 3 to 10 tons. The invention includes thereby the fact that not only a total gap load differential of "nil" or approximately "nil" is maintained, but also that as far as possible equal partial loads are maintained on each of the two halves of the roll gap. The total gap load is composed of the two partial loads, since a roll is mounted and supported at boths ends. If the differential of these two partial loads is far removed from "nil", then a one-sided sheet is produced exhibiting marked differences in thickness, homogeneity and appearance across its width. In the aforementioned case, in which the total load in the gaps of the fifth roll amounts to 200 tons, the loading on each roll bearing is 100 tons. It has been found that in this case a partial load differential between the ends of the roll of no more than 10 tons should be maintained in order to guarantee a constant quality of sheet.

Known control systems, including automatic or semi-automatic systems of controlling a calender installation, where they relate to adjustment of the roll gap, have been restricted to whichever is the last gap. Thus, the web of material emerging from the calender has been measured for thickness by an installation for measuring and regulating the weight per unit of surface area and the size of the last roll gap has been controlled in accordance with the results of these measurements. In the event of divergence from a predetermined desired value, either manual counter control was initiated or a control pulse was transmitted to the positioner of a parallel adjusting means which actuated the adjusting spindles, causing the roll gap to be adjusted until such time as the desired value was restored. Indeed, such a control arrangement can be used for maintaining the desired thickness of the web but it is not possible to prevent differences in gap loading occurring within the calender, loading to inadmissibly great roll flexion and thus to a sheet of inadequate quality. If, for example, the sheet is too thick and a corresponding control pulse is transmitted to the parallel adjusting means for the last roll gap, then the width of the last roll gap is reduced but this causes material fed to this roll gap to become jammed because less material can pass through the roll gap than previously. Such congestion of material causes an enlargement of the pug, and thus the material pressure in this roll gap becomes greater, so that the condition essential to the quality of sheet required is no longer fulfilled. Inadmissible roll flexions can occur and therefore there will be a thickening of the sheet, with the further result of additional narrowing of the roll gap by the regulating system and also damage to the two rolls involved, or the mountings thereof, and also the the adjusting devices.

It is proposed therefore to measure all or almost all gap loads and to regulate and control all or almost all gap widths and thus also the quantities of material which build up, on the basis of these measurements. According to the gap load in a roll gap, it is always the width of the preceding roll gap, considered in the direction opposite to that in which the web moves, which is controlled for this purpose, whereby at the same time the quantity of material passing through this roll gap and the height of pug in the subsequent roll gap will be regulated. Thus, harmful roll gap load differentials are avoided and at the same time an even amount of material in front of the individual roll gaps is assured.

To explain the invention with reference by way of example of an automatically performed process, the accompaning drawing shows a greatly simplified diagrammatic side view of a 6-roll calender. The disposition of the rolls is that of an L calender with rolls 1 to 6, the roll 1 being disposed as a so-called intake roll horizontally beside the roll 2, the rolls 2 to 6 being disposed vertically one above another and the roll 4, represented by reference numeral 7, being a "fixed roll", in other words not being adjustable in position.

In order to be able to adjust the roll gap 9 between the rolls 1 and 2, adjusting means 8 provide for parallel adjustment of the roll 1 and are disposed at both euds thereof, being adapted to act on the bearing journals of the roll.

In order to adjust a roll gap 10 between the rolls 2 and 3, a bilaterally disposed adjusting device 11 is provided and acts upon bearing blocks 12 of the roll 2.

In the same way, a roll gap 13 between the roll 3 and the fixed roll 7 can be adjusted and for this purpose, the roll 3 is disposed in a drive link 14 which acts upon bearings 15 of the roll 3. The drive links 14 disposed at the euds of the roll 3 are raised or lowered by an adjusting device 16.

A roll gap 17 between the rolls 4 and 5 can be adjusted by an adjusting device 19 which acts upon a drive link 18 and a final gap 20 between the last two rolls 5 and 6 can be adjusted by an adjusting device 21.

Reference numeral 22 denotes a system for measuring and regulating the weight per unit of surface area and 23 denotes a control device controlling the spindles of the adjusting means 8, 11, 16, 19 and 21 or their positioners.

For this purpose, the spindle control device 23 receives pulses from pressure measuring means, e.g. pressure cells 24 to 29, which are associated with the adjusting spindles, and in each case at both ends of the rolls in the adjusting spindles or the like of the adjusting means which act upon the bearing blocks, for example the bearing blocks 12 and 15.

The mode of operation is as follows:
The system 22 for measuring and regulating the weight per unit of surface area measures the thickness of a sheet 29 leaving the calender and across the width thereof. If, for example, the web 29 is too thick, then through a line 30 the system 22 transmits a pulse to the adjusting device 21 of the roll 6 so that the width of the gap 20 is diminished and the desired thickness of the sheet web 29 is restored.

However, as a result of reducing the width of the roll gap 20, there is an intensified accumulation of material in this gap, i.e. the pressure in this gap increases. This rise in pressure is registered by the pressure measuring device 28 and is passed via the line 31 to the control device 23 which, by reason thereof, passes a pulse via the line 32 to the adjusting device 19 of the preceeding roll 5, so that the adjusting device 19 is caused to reduce the width of the gap 17, with the result that less material arrives at the oppositely disposed gap 20 of the roll 5.

By reason of the reduction in the width of the gap 17, the material accumulates in and in front of this gap, so that once again the pressure rises and this fact is registered by the pressure measuring device 27. This transmits a pulse via the line 33 to the control device 25 which is thereby, for the purpose of reducing the width of the roll gap 13, caused to transmit a pulse via the line 34 to the positioning device 16. In consequence of this, less material can pass through this gap and in consequence less material can accumulate in the gap 17, so that the pressure in it drops.

Now however, material collects in the gap 13, resulting in a pressure rise. The pressure measuring device 26 at the drive link 14 registers this pressure and, via the line 35, transmits a pulse to the control device 23 which in turn, by reason of the pulse received, passes a regulating pulse via the line 36 to the adjusting device 11, resulting in a reduction in the width of the gap 10. Thus, the quantity of material passing through this gap 10 is likewise reduced and therefore also the quantity of material fed to the gap 13 is reduced.

In the event of the reduction in the cross-section of the gap 10 causing the pressure here to rise, this fact is registered by the pressure measuring device 25, this information being fed via the line 37 into the control device 23 which in turn acts via the line 38 on the adjusting device 8 narrowing the gap 9 whereby here, too, the quantity of material passing through the gap 9 is reduced, which also reduces the quantity fed to the gap 10.

Finally, if the pressure in the gap 9 rises, this is registered by the pressure measuring device 24 and fed via the line 39 to the control device 23, which, via the line 40, acts upon material feed means 41 which is thus caused to deliver less material into the gap 9.

If the system 22 for measuring and regulating the weight per unit of surface area establisheds that the sheet leaving the calender is too thin, the regulating process previously described is effected in reverse sequence.

In certain circumstances, i.e. if the movement of the roll 2 towards or away from the roll 3 does not excessively alter the gap 9 between the rolls 1 and 2 also in a vertical direction, then the variation of the first gap 9 can also be obviated and the pressure rise or drop in the gap 10 can be utilised directly to control the diminished or increased feed of material by the material feed means 41.

The control device 23 further establishes that the pressure differentials registered in the left- and right-hand adjusting means of the rolls 1 to 6 by the pressure measuring means 24 to 28 are compensated. Pressure equalisation is effected in that pulses transmitted for example by the left and right-hand pressure measuring means 27 are transmitted via the line 33 to the control device 23 which compares them with each other. If there is a pressure deviation, i.e. if the pressure measuring device 27 for the left-hand bearing of the roll 5 indicates a value other than that indicated by the pressure measuring device 27 for the right-hand bearing of this roll, pressure equalisation is effected by corresponding regulating pulses which are passed via the line 32 to the adjusting means 19. In consequence, it is ensured that an even pressure obtains over the total length of the roll gap 20, a factor significant to the quality of the sheet and also to the effective life of the rolls, their journals and the roll bearings. Differences in pressure over the length of a roll gap can lead to bearing damage and even roll journal fracture.

The system 22 for measuring and regulating the weight per unit of surface area is likewise able to compensate for different thicknesses of sheet over the width of the web. For example, if it measures the fact that the sheet 29 is too thick on one side, then via the line 30 it controls the adjusting device 21 on the left or right-hand sides so that the deviation in thickness is remedied.

The pressure rises or drops measured in each case can also be utilised in order to achieve manual regulation of a total gap load so that it tends towards zero.

What is claimed is:

1. A multi-roll calender for producing a sheet of elastomeric material, comprising:
   (a) a calender frame;
   (b) a series of rolls, and means mounting the ends thereof in said calender frame, said rolls including an intake roll and a series of vertically superimposed rolls, said intake roll being spaced from the lowermost roll of said series of rolls so as to provide a roll gap, all of said superimposed rolls likewise being spaced from vertically adjacent rolls so as to provide variable roll gaps between each adjacent pair of rolls, said roll gaps following one after another in the direction of sequential movement of said sheet during formation thereof;
   (c) means associated with said rolls for sensing the pressure of the material in each roll gap of the calender;
   (d) means on opposite ends of certain of said rolls responsive to said sensing means for adjusting the width of each roll gap formed by adjacent rolls to cause the difference between the pressures in said gaps to be as small as is practicable, and
   (e) means for maintaining such pressures substantially constant.

2. The multi-roll calender of claim 1 in which for each roll of the calender which is adjustable with respect to one or two rolls mating therewith, there is provided a separate adjusting device and for each such separate adjusting device a pressure sensing device is provided.

3. The multi-roll calender of claim 2, wherein each adjusting device includes positioning motors which act upon each of two mountings of each movable roll.

4. The multi-roll calender of claim 3, in which said adjusting devices and said pressure sensing devices are connected to a single control device.

5. The multi-roll calender of claim 4, wherein said pressure sensing devices of the adjusting devices are disposed at opposite ends of the rolls and are so connected to said control device that their pulses are compared with one another in said control device, said control device including means for feeding compensating counter pulses to operate said positioning motors of said adjusting devices independently of the overall gap setting, so that an even pressure is maintained over the entire length of the roll.

6. The multi-roll calender of claim 4 further including means for measuring the thickness of the finished sheet leaving the calender, and wherein said adjusting means includes means for controlling adjustment of the width of a final roll gap in the direction of movement of the sheet in accordance with said measured thickness; means for sensing the pressure change in said final roll gap resulting from said adjustment; said control device using said measured pressure change as a control variable for adjustment of the width of the roll gap immediately preceding said final gap, whereby such adjustment can be repeated back to at least the second roll gap, considered in the direction of movement of the material through the calender, the result being that adjustment of the gap width and thus change of the pressure in a forward one of the gaps of the calender in the direction of web movement brings about an adjustment of the preceding gap and thus a change in the rate of supply of material into said forward gap.

7. The multi-roll calender of claim 6 further including means for feeding material into the first gap, and means to control such feed in response to a measured pressure change in said first or immediately succeeding roll gap.

8. The multi-roll calender of claim 1 wherein said intake roll is positioned laterally of said lowermost roll of said series of rolls, and wherein one of said vertically superimposed rolls is intermediate and fixed and the others are vertically movable by said adjusting means relative to the adjacent rolls.

9. The multi-roll calender of claim 8 wherein the rolls adjacent to said fixed intermediate roll are mounted in drive links each of which is vertically movable by said adjusting means toward or away from ssaid fixed roll.

10. The multi-roll calender of claim 1 wherein said sensing means comprise pressure cells positioned at each end of the mounting means for each roll, said pressure cells measuring the pressure at each end of each roll and transmitting a measured signal to a control device which in turn transmits a signal to the appropriate adjusting means for roll adjustment.

* * * * *